UNITED STATES PATENT OFFICE.

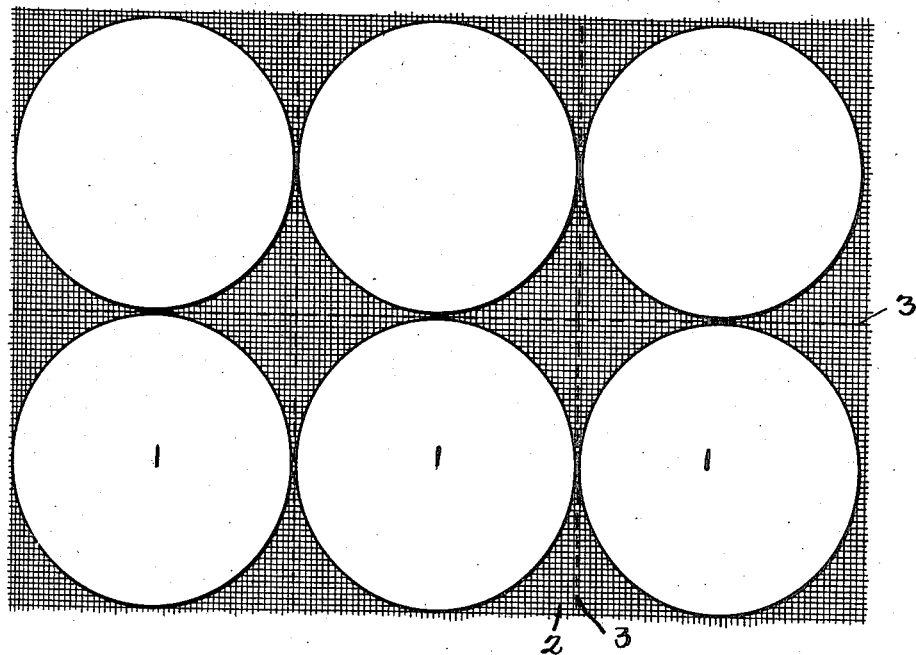

JOSEPH G. MOOMY, OF ERIE, PENNSYLVANIA.

PATCH FOR RUBBER ARTICLES.

1,068,691.  Specification of Letters Patent.  Patented July 29, 1913.

Application filed March 26, 1912.  Serial No. 686,282.

*To all whom it may concern:*

Be it known that I, JOSEPH G. MOOMY, a citizen of the United States, residing at Erie, in the county of Erie and State of Pennsylvania, have invented new and useful Improvements in Patches for Rubber Articles, of which the following is a specification.

This invention relates to patches for rubber articles and consists in certain improvements in the construction thereof as will be hereinafter fully described and pointed out in the claim.

The invention is illustrated in the accompanying drawings as follows:—

Figure 1 shows a view of a series of patches in the process of manufacture. Fig. 2 a plan view of the finished patch. Fig. 3 an enlarged cross section through the material forming the patch.

1 marks the patch, 2 a backing of muslin on which the patches are arranged. In the manufacture of the patches, the rubber portion 1 is preferably formed round as shown, and these portions are laid on a muslin backing as indicated in Fig. 1. The muslin is then cut at the dashed lines 3 and thus forms the patch shown in Fig. 2. In the use of these patches, the muslin portion 5 is removed. By leaving the muslin square or rectangular with the rubber portion round or of a different shape than the muslin corners as 5 will be left to facilitate the separation of the muslin from the rubber when it is desired to use the patch. This flap or extension of the muslin is obtained without any waste of material, and therefore, this desirable feature is accomplished without additional expense. In fact, in some respects the cutting of the muslin in straight lines is simpler than trimming it to the size of the rubber.

The contact face of the rubber patch in order to adhere readily to the article being patched is ordinarily formed of raw rubber or rubber that is not vulcanized. Rubber in this condition adheres much more readily than a vulcanized rubber. Heretofore, patches of this kind have been made by forming a layer of vulcanized rubber as 6 and then placing on this a layer of raw rubber or non-vulcanized rubber 7. The muslin 2 is placed on the face of the raw rubber to facilitate the handling and shipping of the patches prior to their application. The layer of raw rubber has heretofore been secured to the layer of vulcanized rubber by the use of cement or cold process solutions, the raw rubber being united with the vulcanized rubber after the vulcanization of the vulcanized layer. Benzin or some similar fluid is usually applied to the surfaces so as to soften the rubber and facilitate the adhesion of the rubber. The difficulty with patches heretofore made is that this application of benzin or similar material has had the effect of loosening in many instances the layer of raw rubber from the layer of vulcanized rubber. The displacement of the vulcanized rubber exposes the outer surface of the raw rubber so that when used on inner tubes for tires, the tube by reason of the exposure of the raw rubber of the inner layer adheres to the inner surface of the tire shoe and this is objectionable.

I obviate the difficulty just hereinbefore mentioned by forming the layer of raw rubber of non-vulcanizing or raw stock and placing it in contact with the layer of vulcanizing stock having the usual ingredients to effect the vulcanization and vulcanizing the vulcanizing layer in contact with the layer of raw rubber. The vulcanizing compound of the vulcanizing layer penetrates the contacting surface of the layer of raw rubber slightly so that there is a complete union between the layer of raw rubber and the layer of vulcanizing stock as the layers are vulcanized. On the other hand, the vulcanizing material does not penetrate the layer of raw rubber sufficiently to impair the adhesive efficiency of the outer surface of the layer of raw rubber.

What I claim as new is:—

A patch for rubber articles having one surface raw rubber and the opposite surface vulcanized rubber and formed of a layer of raw rubber, and a layer of vulcanizing stock united by and during the vulcanization of the vulcanizing stock.

In testimony whereof I have hereunto set my hand in the presence of two subscribing witnesses.

JOSEPH G. MOOMY.

Witnesses:
B. M. HARTMAN,
THOMAS C. MILLER.